United States Patent Office 3,563,943
Patented Feb. 16, 1971

3,563,943
NONIONIC URETHANE LATICES HAVING IMPROVED LOW TEMPERATURE STABILITY
Pauls Davis, Gibralter, and Oscar M. Grace, Madison Heights, Mich., assignors to Wyandotte Chemicals Corporation, Wyandotte, Mich., a corporation of Michigan
No Drawing. Filed Feb. 5, 1968, Ser. No. 702,810
Int. Cl. C08g 53/18; C08j 1/48
U.S. Cl. 260—29.2
5 Claims

ABSTRACT OF THE DISCLOSURE

Nonionic urethane latices having improved low temperature stability are obtained by the use of certain oxyethylene-containing compounds as emulsifiers therefor. The oxyethylene-containing emulsifiers are prepared by the reaction of aromatic diepoxides with polyethylene glycol.

---

The present invention relates to nonionic urethane latices having improved low temperature stability. More particularly, the invention relates to the use of certain oxyethylene-containing compounds as emulsifiers for urethane latices.

Urethane latices are well known in the art. They are generally prepared by chain-extending in the presence of water an emulsified isocyanate-terminated prepolymer obtained by the reaction of an organic compound having at least two active hydrogen atoms with a stoichiometric excess of an organic polyisocyanate. Numerous nonionic emulsifying agents have been employed in the preparation of urethane latices. However, a major disadvantage associated with nonionic urethane latices has been their poor low temperature stability. All known nonionic latices when subjected to temperatures of around 32° F. to 60° F. coagulate.

Accordingly, it is an object of the present invention to provide for nonionic urethane latices A further object of the present invention is to provide for nonionic urethane latices which are stable at low temperatures and for an extended period of time. Still another object of the present invention is to provide for novel nonionic emulsifying agents for urethane latices. These and other objects of the present invention will be apparent from the specification and examples which follow.

The above objects of the present invention are accomplished by the use of certain nonionic oxyethylene-containing compounds as emulsifiers for urethane latices. The oxyethylene-containing nonionic emulsifiers which are employed in the present invention are prepared by the reaction of a polyethylene glycol having a molecular weight of from about 5,000 to about 10,000 with an aromatic diepoxide having the formula:

(I) 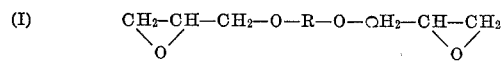

wherein R is a radical containing a substituted or unsubstituted aromatic nucleus. Generally, a mole ratio of glycol to diepoxide of at least 2:1 is employed. The nonionic emulsifiers are characterized by a molecular weight of from about 12,000 to 24,000 and by terminal hydroxyl groups. The preferred aromatic diepoxides which may be employed in the preparation of the emulsifiers of the present invention are the reaction products of halohydrins and dihydroxy phenols. These diepoxides may be represented by the formula:

(II) 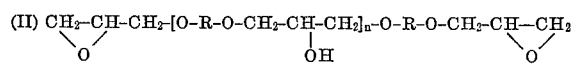

wherein $n$ is an integer from 0 to 50 and R represents a divalent phenolic radical. Typical halohydrins which may be used in the preparation of the above reaction products include epichlorohydrin, 3-chloro-1,2-propane diol, and glycerol dichlorohydrin. Typical dihydroxy phenols include the mononuclear phenols such as resorcinol and catechol as well as the polynuclear phenols such as the isomers of dihydroxy diphenylmethane and of dihydroxy diphenyl dimethylmethane and polyhydric phenyl formaldehyde condensation products. Generally, from about 0.5 part by weight to about 6 parts by weight of the emulsifier based on 100 parts of prepolymer will be sufficient to produce the stable emulsions of the present invention.

As mentioned above, the urethane latices of the present invention are generally prepared from three reactants, namely, an organic polyisocyanate, an organic compound having at least two active hydrogen atoms, and a chain extending agent. Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane - 4,4' - diisocyanate, 4,4'-biphenylene diisocyanate, 3,3' - dimethoxy - 4,4' - biphenyl diisocyanate, 3,3'-dimethyl-4,4'-biphenyl diisocyanate, and 3,3'-dimethyldiphenylmethane - 4,4' - diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane 2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

Any organic compound having at least two active hydrogen atoms may be employed in the preparation of the polyurethane latices. The term "active hydrogen atoms" refers to hydrogen atoms which, because of their position in the molecule, display activity according to the Zerewitinoff test as described by Kohler in J. of Am. Chem. Soc., 49, 3181 (1927).

The active hydrogen atoms are usually attached to oxygen, nitrogen, or sulphur atoms. Thus, suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, aliphatic thiols including alkane, alkene, and alkyne thiols having two or more —SH groups; diamines including both aromatic, aliphatic, and heterocyclic diamines, as well as mixtures thereof. Compounds which contain two or more different groups within the above-defined classes may also be used such as, for example, amino alcohols which contain an amino group and a hydroxyl group. Also compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-(4,4'-hydroxyphenol)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, propylene glycol, and 2,2-(4,4'-hydroxyphenyl)-propane and blends thereof having equivalent weights of from 250 to 5000.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-secondary diamino naphthalene, and 2,4-secondary diamino toluylene; aliphatic polyamines such as N,N'-secondary ethylene diamine, N,N'-secondary 1,3-propylene diamine, N,N'-secondary 1,4-butylene diamine, and N,N'-secondary 1,3-butylene diamine. Alkylene oxide adducts of any of the above polyamines may also be used, particularly propylene oxide adducts of p-amino aniline and ethylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

The isocyanate-terminated prepolymers are ordinarily prepared by heating the organic polyisocyanate and the organic compound containing at least two active hydrogen atoms with agitation at a temperature of from about 60° C. to about 110° C., preferably from about 70° C. to about 90° C. A catalyst may be employed in this reaction if desired. If a catalyst is employed, temperatures below 60° C. may be used. The reactants are heated for a period sufficient to react all the hydroxyl groups, whereafter the prepolymer is allowed to stand and the free NCO content determined. Generally, total reaction time will be from about two hours to about four hours. However, if a catalyst is employed, a period of from about fifteen minutes to about one hour is sufficient.

The reaction is preferably carried out, but not necessarily, in the presence of a solvent. If the prepolymer is a fluid at processing temperatures, it is possible to carry out the reaction in the absence of a solvent. Convenient solvents are organic solvents having a boiling range above 90° C. when the reaction is to be carried out in open equipment. Lower boiling solvents may, of course, be used where the reaction is carried out in closed equipment to prevent boiling off the solvent at the temperatures of the reaction. The solvent, when used, may be added at the beginning, at an intermediate point, or at the end of the prepolymer stage, or after cooling of the formed prepolymer. The solvents to be used are preferably those in which the reactants are soluble. Ketones and esters may be used. The aliphatic hydrocarbon solvents such as the heptanes, octanes, and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Hydrocarbon solvents such as toluene and benzene are preferred. The amount of solvent used may be varied widely. From 25 parts to 400 parts of solvent per 100 parts of active hydrogen-containing compound have been found to be operable. The excess solvent, where large amounts are employed, may be separated partially or completely from the polymer prior to emulsification in the water solution; sometimes the excess solvent is useful and is allowed to remain during the emulsification stage.

The amounts of organic polyisocyanate and organic compound having at least two active hydrogen atoms which are employed in the preparation of the prepolymers are such that the NCO/OH equivalent ratio is between 1.3:1 to 3:1, preferably 1.5:1 to 2:1. At ratios greater than 3:1, incompatible resins tend to form, while at ratios less than 1.3:1, gelling of the polymer tends to occur.

After the prepolymer is prepared, it is emulsified by combining it with an aqueous solution of an emulsifier with vigorous agitation. Emulsification of the prepolymer may occur by adding an aqueous solution of an emulsifier to the prepolymer, by adding the prepolymer to an aqueous solution of an emulsifier, by initially adding an emulsifier to the prepolymer reactants and then adding water after the prepolymer has been prepared, or by adding an emulsifier to an aqueous medium containing the prepolymer. The amount of water to be employed in the formation of the emulsion is not critical. When too small an amount of water is employed, emulsions are obtained which are too thick to handle readily while, on the other hand, dispersions which are too dilute are uneconomical to handle due to their excessive volume.

Chain extension of the prepolymers occurs by adding a chain-extending agent to the emulsifier prepolymer. The chain-extending agent is preferably added in the form of an aqueous solution or dispersion thereof. However, it may be added alone or in the form of a solvent solution thereof.

The chain-extending agents which may be employed in the preparation of the latices of this invention are those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine 1,4-cyclohexane-bis-(methylamine), ethylene diamine, diethylene triamine, N-(2-hydroxypropyl)ethylene diamine, N,N' - di(2 - hydroxypropyl)ethylene diamine, piperazine, 2-methylpiperazine, morpholine, and dodecahydro-1,4,7,9b-tetraazaphenaline.

The amount of chain extending agent which is employed in the preparation of the latices of this invention is preferably about 1.0 equivalent of chain extending agent for each isocyanate equivalent. Up to about 1.3 equivalents may be employed. The chain extension step may frequently be assisted by agitation of the emulsion for some time after its initial formation. This is usually accomplished by means of a conventional paddle-type agitator at 30 r.p.m. to 90 r.p.m. or other conventional stirring equipment such as a Cowles Dissolver which aids in contacting the emulsion droplets with the chain extender.

The following examples serve to illustrate the invention. All parts are by weight unless otherwise specified. In the examples, tests were carried out in accordance with standard ASTM procedures. The procedures used were:

Tensile strength _____ D412-61
Modulus _____ D412-61
Elongation _____ D412-61
Shore A hardness _____ D676-59
Water absorption _____ D471-64

The low temperature stability tests were carried out in the following manner.

The test apparatus employed consisted of a small laboratory polymerization bath equipped with a refrigeration unit, immersion heater, recycle timers, and temperature controllers. A small rotator was built to tumble the latex samples at about 100 r.p.m. The equipment was designed to produce the following temperature cycle: (a) from 75° F. to 32° F. in twelve hours, (b) maintained at 32° F. for eight hours, (c) from 32° F. to 110° F in eight hours, (d) maintained at 110° F. for sixteen hours, and (e) from 110° F. to 75° F. in four hours. The total cycle requires 48 hours.

The stability tests were conducted by clamping on the rotator a one ounce jar filled to about 80% of capacity with a candidate latex. The rotator was driven by a 100 r.p.m. motor producing a mild tumbling of the latex. The temperature cycle was automatically controlled by the equipment. At the conclusion of the cycle, the candidate latex is removed from the jar and checked for coagulum by observation. A latex with good mechanical stability should pass five cycles.

EXAMPLE I

A reaction vessel equipped with a thermometer, stirrer, and heat exchange means was charged with 3960 parts of a 660 molecular weight polyol prepared from propylene oxide and Bisphenol A, 2,2-bis(4-hydroxyphenyl) propane, and 8905 parts of a 3000 molecular weight polyol prepared from propylene oxide and glycerine. To the vessel were then charged 3654 parts of tolylene diisocyanate (80/20 mixture of 2,4-2,6 isomers) in 1652 parts of toluene. The charge was stirred for about three hours at 80° C. to 90° C. After cooling the resulting prepolymer to about 25° C., the unreacted NCO-content of the prepolymer was determined.

Four parts of a nonionic surface active agent having a molecular weight of about 14,000 prepared by the reaction of two moles of polyethylene glycol having a molecular weight of 6000 with one mole of an aromatic diepoxide obtained by the condensation of two moles of epichlorohydrin with Bisphenol A was then dissolved in 70 parts of water cooled to about 10° C. The aqueous solution of surfactant was then aded to 110 parts (10 parts toluene) of the cooled prepolymer solution to which had been added 30 additional parts of toluene with good agitation. A mixture of 4.9 parts of 2-methylpiperazine and 1.6 parts of morpholine dissolved in 40 parts of cold water was then added with vigorous agitation to the emulsified prepolymer. A portion of the urethane latex so formed was tested for low temperature stability as described above. Another portion was cast and the physical properties of the resulting films tested.

The above preparation was duplicated with the exception that a conventional nonionic surface active agent was employed in lieu of the surface active agent of the present invention. The conventional surfactant employed was a 16,000 molecular weight polyoxyethylene polyoxypropylene block copolymer having a polyoxyethylene content of about 80% by weight and a molecular weight polyoxypropylene base of about 3250.

The latex prepared in accordance with the present invention underwent five cycles, each of 48 hours, without any indication of coagulation. The latex prepared with the conventional surfactant coagulated within the first twelve hours of the first cycle. The test was repeated on the latex prepared with the conventional surfactant over twenty times, and in each test the latex coagulated within the first twelve hours of the first cycle.

Physical properties of films prepared from the latices are presented in Table I.

TABLE I

| Properties, surfactant | Conventional | Example I |
|---|---|---|
| Tensile strength, p.s.i. | 2,185 | 2,023 |
| 300% modulus | 685 | 1,097 |
| 100% modulus | 250 | 407 |
| Elongation, percent | 515 | 422 |
| Shore A hardness | 65 | 67 |
| Water absorption, weight percent, 24 hours at 77° F | 16 | 9 |

After eleven months aging at room temperature, the physical properties of the film prepared from the latex of Example I were retested. Results indicate that no significant degradation occurred. Thus, Example I demonstrates the superior low temperature stability of the latices of the present invention obtained without any significant immediate or long term loss in the physical properties of films cast therefrom.

EXAMPLE II

Several urethane latices were prepared in the manner described in Example I. Details of the preparations, results of stability tests of the latices, and physical properties of films cast therefrom are presented in Table II which follows.

TABLE II

| | | | Latex preparation | | | | | | Physical properties | | | | |
|---|---|---|---|---|---|---|---|---|---|---|---|---|---|
| | Polyol | Parts | Average equivalent wt. | TDI, parts | Surfactant | Parts | Chain extending agent | Parts | Stability, No. of cycles | Tensile strength, p.s.i. | 300% modulus | 100% modulus | Percent elongation |
| Example: | | | | | | | | | | | | | |
| II | (1)(2) | 68.5 | 337.5 | 26.5 | (a) | 6 | 2MP | 5 | 5 | 4,063 | 487 | 200 | 572 |
| III | (1)(2) | 68.5 | 337.5 | 26.5 | (b) (c) | 3 3 | 2MP | 5 | 0 | 3,825 | 600 | 280 | 540 |
| IV | (1)(3) | 72.8 | 600 | 21.1 | (a) | 4 | 2MP | 6.1 | 5 | 3,743 | 520 | 223 | 565 |
| V | (1)(3) | 72.8 | 600 | 21.1 | (c) | 3 | 2MP | 6.1 | 0 | 3,350 | 410 | 205 | 625 |
| VI | (1)(2) | 59.2 | 275 | 32.8 | (a) | 4 | 2MP | 8.0 | 5 | 7,361 | 5,184 | 2,128 | 365 |
| VII | (1)(2) | 59.2 | 275 | 32.8 | (b) | 4 | 2MP | 8.0 | 0 | 7,050 | 4,835 | 1,985 | 370 |
| VIII | (1)(2) | 59.2 | 275 | 32.8 | (a) | 4 | MON | 8.0 | 5 | 6,225 | 3,075 | 1,350 | 455 |
| IX | (1)(2) | 59.2 | 275 | 32.8 | (b) | 4 | MON | 8.0 | 0 | 6,565 | 2,180 | 805 | 515 |
| X | (4) | 90.5 | 2,143.3 | 7.4 | (a) | 5 | 2MP | 2.1 | 5 | 580 | 180 | 82 | 657 |
| XI | (4) | 90.5 | 2,143.3 | 7.4 | (b) | 5 | 2MP | 2.1 | 0 | 543 | 127 | 68 | 783 |

NOTE.—(1) = 400 molecular weight polypropylene glycol
(2) = 700 molecular weight polypropylene glycol
(3) = 1,300 molecular weight polypropylene glycol
(4) = 6,430 molecular weight polyol prepared by capping with ethylene oxide, a propylene oxide adduct of trimethylolpropane (5% ethylene based on total weight)
TDI = 80/20 mixture of 2,4-2,6-tolylene diisocyanate
2MP = 2-methylpiperazine
MON = N-(2-hydroxypropyl) ethylene diamine
(a) = Dihydric reaction product of two moles of polyethylene glycol having a molecular weight of about 6,000 with one mole of an aromatic epoxy resin having a molecular weight of about 2,000 prepared from epichlorohydrin and Bisphenol A
(b) = Dihydric polyoxyethylene polypropylene having a molecular weight of 16,250, a polyoxyethylene content of about 80% by weight and a polyoxypropylene base molecular weight of about 3,250
(c) = Nonylphenoxy polyoxyethylene ethanol.

EXAMPLE III

The procedure described in Example I is duplicated with the exception that the emulsifier employed has a molecular weight of about 20,000 and is prepared by the reaction of two moles of a polyethylene glycol having a molecular weight of 8000 with one mole of an aromatic diepoxide obtained by the condensation of four moles of epichlorohydrin with Bisphenol A. Results substantially similar to those described in Example I are obtained.

The latices of this invention are useful in many applications. Among the many articles and uses to which these latices are applicable may be mentioned the following: fabric coatings for rainwear, tarpaulins and baby pants; fabric and textile filament impregnants to improve abrasion resistance and wrinkle resistance; fabric laminating adhesives; paper coatings and impregnants for improved durability, grease resistance, gloss and wet and tear tear strength; binders for non-woven fabrics; industrial adhesives; production of urethane films and fibers, leather coating and impregnants for improved abrasion resistance and water resistance; and industrial coatings for metal, wood, and concrete.

What is claimed is:

1. In a process for the preparation of urethane latices by chain extending with a compound selected from the group consisting of water, primary diamines and secondary diamines in an aqueous medium an emulsified NCO-terminated prepolymer prepared by the reaction of an organic compound having at least two active hydrogen atoms with a stoichiometric excess of an organic polyisocyanate, the improvement which comprises employing as emulsifier for said latices a reaction product of a polyethylene glycol having a molecular weight of from about 5,000 to 10,000 and an aromatic diepoxide having the formula:

(I) 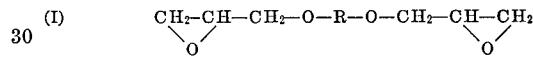

wherein R is a radical containing a substituted or unsubstituted aromatic nucleus.

2. The process of claim 1 wherein the organic compound having at least two active hydrogen atoms is a blend of polyalkylene polyether polyols.

3. The process of claim 1 wherein the aromatic diepoxide is a reaction product of an epichlorohydrin and a dihydroxyphenol.

4. The process of claim 1 wherein the chain-extending agent is 2-methylpiperazine.

5. The urethane latices prepared in accordance with claim 1.

References Cited

UNITED STATES PATENTS

| 2,968,575 | 1/1961 | Mallonee | 260—29.2 |
| 3,294,724 | 12/1966 | Axelrod | 260—29.2 |
| 3,437,624 | 4/1969 | Dawn et al. | 260—29.2 |
| 3,438,924 | 4/1969 | Chalmers et al. | 260—29.6 |

JULIUS FROME, Primary Examiner

A. H. KOECKERT, Assistant Examiner

U.S. Cl. X.R.

260—830